Oct. 7, 1941.   E. MILLER   2,258,331
MANUFACTURE OF GOLF BALLS AND THE LIKE
Filed Sept. 25, 1937
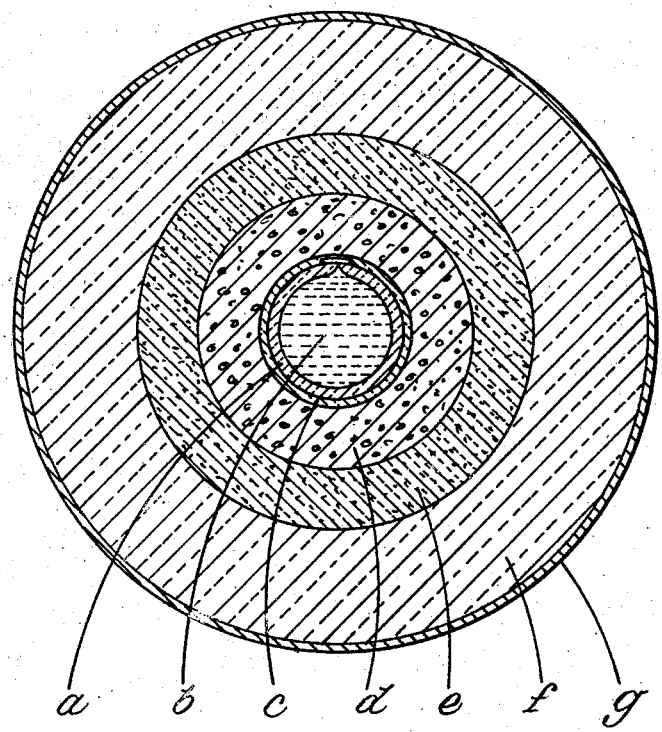
INVENTOR
ELLIS MILLER
BY
ATTORNEY Patented Oct. 7, 1941

2,258,331

UNITED STATES PATENT OFFICE 2,258,331

MANUFACTURE OF GOLF BALLS AND THE LIKE

Ellis Miller, Brussels, Belgium

Application September 25, 1937, Serial No. 165,641
In Great Britain September 8, 1937

11 Claims. (Cl. 273—62)

In the manufacture of a modern golf ball a suitable fluid is usually enclosed in a small rubber sack, which is wound around with rubber thread or tape, under tension, to the required size and afterwards enclosed in a gutta percha or like cover which is vulcanized in position.

The object of the present invention is to provide an improved golf or like ball which will have great steadiness both in flight and when rolling on the ground, for which purpose, and in accordance with this invention the fluid with which the sack is filled is mercury. Preferably the sack, which may be of rubber or other suitable material, is enclosed first in a layer of rubber, then in a layer consisting of a mixture of granulated cork, preferably paraffin treated, rubber and kauri resin, then in a layer consisting of a mixture of rubber, granulated nickel and kauri resin, and the core thus produced is afterwards wound and covered in the usual manner.

The layer of granulated cork and kauri resin preferably consists of finely granulated cork the surface of which is impregnated with paraffin wax, rubber and a small quantity of kauri resin to serve as a binder. This acts as a cushion around the mercury filled sack. The layer of rubber, granulated nickel and kauri resin is preferably prepared by heating a mixture of rubber and kauri resin to about 130° C., adding granulated pure nickel and stirring the mixture which is then applied by means of a suitable mould.

One form of golf ball made according to the present invention is illustrated by the accompanying drawing which is a central section.

$a$ is a rubber sack 0.75 m. m. thick and weighing 0.2 grammes, which is charged with 3 grammes of mercury $b$, diameter 7.5 m. m., and tied in the usual manner, the mean diameter of the filled and tied sack being 9 m. m. This sack is enclosed in a layer $c$ of rubber which is 0.5 m. m. thick and weighs 0.5 grammes. The core, so far made, is then enclosed in a layer $d$ of finely granulated cork superficially impregnated with paraffin wax, mixed with rubber and a small quantity of kauri resin as a binder and heated to fuse the kauri resin; this layer $d$ is 4 m. m. thick and weighs 2 grammes, bringing up the diameter of the core to 18 m. m. The core, so far made, is then enclosed in a layer $e$ consisting of rubber, granulated pure nickel and a small quantity of kauri resin, prepared as above. The weight of nickel employed depends on requirements and may be such that the weight of the layer $e$ is from, say, 9.3 grammes to, say, 13.3 grammes. The mixture is applied by means of a mould, the core being disposed centrally therein, and the diameter of the core is thus brought up to 26 m. m., after which it is wound with rubber thread or tape $f$ and covered, as at $g$, in the usual manner.

It is to be understood that the proportions of the materials employed in the respective layers and the thickness of the layers may be varied according to requirements.

I claim:

1. A ball having a central core consisting of a globule of metallic mercury restrained from shifting outside of the geometrical center of the ball and acting to fix within it and thereby stabilize the centroid of the ball, and, wherein the mercury globule is contained in a flexible hollow member which is surrounded by successive layers of (a) rubber, (b) a mixture of granulated cork, rubber and kauri resin, (c) a mixture of rubber, granulated nickel and kauri resin, (d) strip rubber wound under tension and (e) gutta percha constituting an outer cover, and, in which the weight of mercury is 2.8 grams, the weight of the hollow member for the mercury is 0.6 grams, the weight of the mixture of granulated cork, rubber, and kauri resin is 2.4 grams, and the weight of the mixture of rubber, granulated nickel and kauri resin is 10 grams.

2. A golf ball having a substantially spherical central core portion of higher specific gravity than the average specific gravity of the ball and comprising a hollow container member of resilient material, and a body of metallic mercury substantially completely filling said container member, said body of mercury being relatively immovable within the container and acting to fix and stabilize the centroid of the ball during normal flight, said container being positioned at the exact center of the ball, and the weight of the mercury being less than 10% of the total weight of the ball, and, in which the flexible member is surrounded by a layer of rubber and then by a layer consisting of a mixture of granulated cork, rubber and kauri resin, the granulated cork being paraffin-treated.

3. A golf ball having a substantially spherical central core portion of higher specific gravity than the average specific gravity of the ball and comprising a hollow container member of resilient material, and a body of metallic mercury substantially completely filling said container member, said body of mercury being relatively immovable within the container and acting to fix and stabilize the centroid of the ball during normal flight, said container being positioned at the exact center of the ball, and the weight of the mercury being less than 10% of the total weight of the ball, and, in which the flexible member is surrounded, successively, by a layer of rubber, a layer constituted of a mixture of granulated cork, rubber and kauri resin, and a layer constituted of a mixture of rubber, granulated nickel and kauri resin.

4. A golf ball having a substantially spherical central core portion of higher specific gravity than the average specific gravity of the ball and comprising a hollow container member of resilient material, and a body of metallic mercury substantially completely filling said container member, said body of mercury being relatively immovable within the container and acting to fix and stabilize the centroid of the ball during normal flight, said container being positioned at the exact center of the ball, and the weight of the mercury being less than 10% of the total weight of the ball, and, in which the flexible member is surrounded successively by a layer of rubber, a layer constituted of a mixture of granulated cork, rubber and kauri resin, a layer constituted of a mixture of rubber, granulated nickel and kauri resin, a strip of rubber wound under tension, and an outer cover constituted of gutta percha.

5. A ball having a substantially spherical core portion comprising a hollow flexible member of resilient material and a body of metallic mercury completely filling the interior of said member and positioned at the exact center of the ball, the diameter of the flexible member containing the mercury being substantially less than one-third the diameter of the ball, and in which the flexible member is surrounded by a layer of rubber and then by a layer consisting of a mixture of granulated cork, rubber and kauri resin, the granulated cork being paraffin-treated.

6. A ball having a substantially spherical core portion comprising a hollow flexible member of resilient material and a body of metallic mercury completely filling the interior of said member and positioned at the exact center of the ball, the diameter of the flexible member containing the mercury being substantially less than one-third the diameter of the ball, and in which the flexible member is surrounded, successively, by a layer of rubber, a layer constituted of a mixture of granulated cork, rubber and kauri resin, and a layer constituted of a mixture of rubber, granulated nickel and kauri resin.

7. A ball having a substantially spherical core portion comprising a hollow flexible member of resilient material and a body of metallic mercury completely filling the interior of said member and positioned at the exact center of the ball, the diameter of the flexible member containing the mercury being substantially less than one-third the diameter of the ball, and in which the flexible member is surrounded successively by a layer of rubber, a layer constituted of a mixture of granulated cork, rubber and kauri resin, a layer constituted of a mixture of rubber, granulated nickel and kauri resin, a strip of rubber wound under tension, and an outer cover constituted of gutta percha.

8. A ball having a substantially spherical core portion comprising a hollow flexible member of resilient material and a body of metallic fluid completely filling and trapped within said flexible member at the exact center of the ball, the specific gravity of the trapped fluid being greatly in excess of the average specific gravity of the ball, said metallic fluid acting to keep the center of gravity of the ball during flight and roll of the ball at the geometrical center thereof, and in which the flexible member is surrounded by a layer of rubber and then by a layer consisting of a mixture of granulated cork, rubber and kauri resin, the granulated cork being paraffin-treated.

9. A ball having a substantially spherical core portion comprising a hollow flexible member of resilient material and a body of metallic fluid completely filling and trapped within said flexible member at the exact center of the ball, the specific gravity of the trapped fluid being greatly in excess of the average specific gravity of the ball, said metallic fluid acting to keep the center of gravity of the ball during flight and roll of the ball at the geometrical center thereof, and in which the flexible member is surrounded, successively, by a layer of rubber, a layer constituted of a mixture of granulated cork, rubber and kauri resin, and a layer constituted of a mixture of rubber, granulated nickel and kauri resin.

10. A ball having a substantially spherical core portion comprising a hollow flexible member of resilient material and a body of metallic fluid completely filling and trapped within said flexible member at the exact center of the ball, the specific gravity of the trapped fluid being greatly in excess of the average specific gravity of the ball, said metallic fluid acting to keep the center of gravity of the ball during flight and roll of the ball at the geometrical center thereof, and in which the flexible member is surrounded successively by a layer of rubber, a layer constituted of a mixture of granulated cork, rubber and kauri resin, a layer constituted of a mixture of rubber, granulated nickel and kauri resin, a strip of rubber wound under tension, and an outer cover constituted of gutta percha.

11. A ball having a central core consisting of a globule of metallic mercury restrained from shifting outside of the geometrical center of the ball and acting to fix within it and thereby stabilize the centroid of the ball, and wherein the mercury globule is contained in a flexible hollow member which is surrounded by successive layers of (a) rubber, (b) a mixture of granulated cork, rubber and kauri resin, (c) a mixture of rubber, granulated nickel and kauri resin, (d) strip rubber wound under tension and (e) gutta percha constituting an outer cover.

ELLIS MILLER.